(No Model.)
I. C. LIGETT.
STIRRER AND PULVERIZER.
No. 403,118. Patented May 14, 1889.
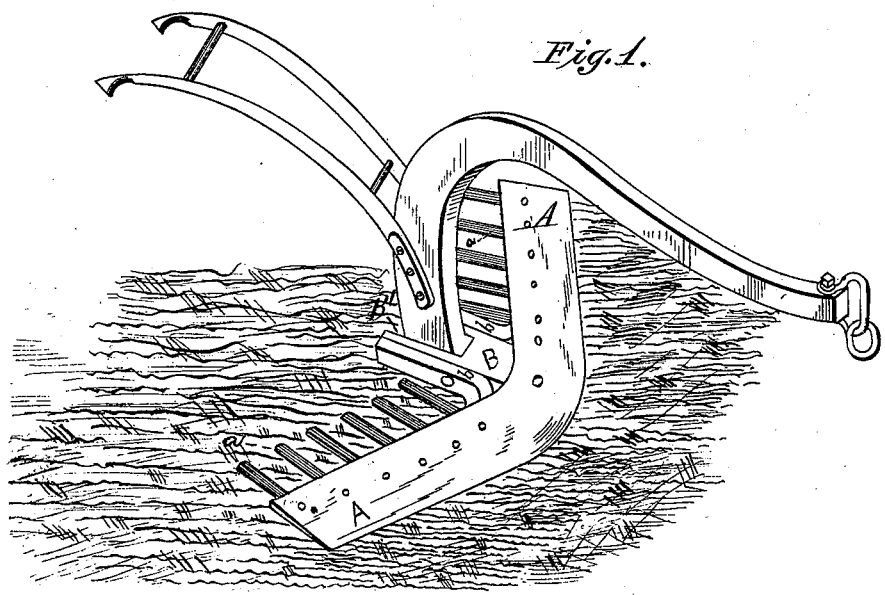
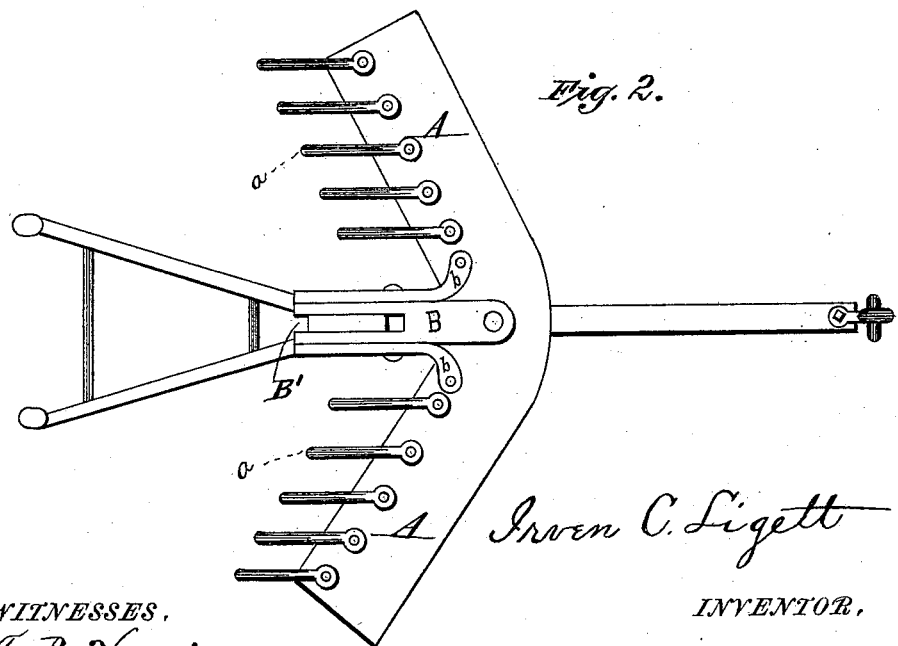
WITNESSES.
M. B. Harris.
S. C. Fitzgerald
INVENTOR.
Irven C. Ligett
By W. T. Fitzgerald
Attorney.

UNITED STATES PATENT OFFICE.

IRVEN C. LIGETT, OF WARNERTON, KANSAS.

STIRRER AND PULVERIZER.

SPECIFICATION forming part of Letters Patent No. 403,118, dated May 14, 1889.

Application filed December 1, 1888. Serial No. 292,387. (No model.)

*To all whom it may concern:*

Be it known that I, IRVEN C. LIGETT, a citizen of the United States, residing at Warnerton, in the county of Coffey and State of Kansas, have invented certain new and useful Improvements in Stirrers and Pulverizers; and I do hereby declare the following to be a full, clear, and exact description of the invention, such as will enable others skilled in the art to which it appertains to make and use the same.

My invention relates to improvements in pulverizers; and it consists in certain novel features, hereinafter described and claimed.

In the accompanying drawings, Figure 1 is a perspective view of my improved device, and Fig. 2 is a bottom plan view of the same.

Referring to the drawings by letter, A designates the share or blade, which inclines rearwardly on each side of its center. The rear edge of the share is elevated slightly above its front edge, so that the earth will be turned up, and to the under side of the share, near its rear edge, I secure a series of parallel rearwardly-projecting fingers, $a$, which serve to cut up and pulverize the soil as it passes from the share.

The shank B is secured to the under side of the share, at the center of the same, and projects rearwardly therefrom, its rear end being provided with a longitudinal slot, B', as shown. The end of the standard is secured in this slot B', and the shank and standard are prevented from vibrating, and the share consequently held to its work by the braces $b$, which lie alongside the shank and are secured thereto. The braces, it will be observed, lie close against the shank, so as to effectually re-enforce the same, and at the same time do not enter the path of the soil passing between the fingers to cause a clogging thereof. The front ends of the braces are bent slightly outward and secured to the under side of the share.

In practice the device is drawn over the ground in the usual manner, and pulverizes the soil so as to prepare it for planting, as will be readily understood.

The rear edge of the share being elevated, ample room is provided for the attachment of the several parts to its under side, thus leaving its upper side entirely free and smooth for the passage of the soil. The arrangement of the braces is very compact and lends great strength to the device, besides being such that in the event of one of the parts being broken ready access can be had to it for the purpose of repairing the injury.

I am aware that pulverizers have been heretofore devised having a share which is substantially V shape and provided with rearwardly-projecting fingers, and make no claim, broadly, to such a device.

Having thus described my invention, what I claim, and desire to secure by Letters Patent, is—

As an improvement in earth-pulverizers, the combination of the share, the rearwardly-projecting fingers secured to the under side of the share, the shank secured to the under side of the share projecting rearwardly therefrom and having a longitudinal slot in its rear end, the standard having its end secured in said longitudinal slot, and the braces lying alongside the shank and secured thereto, and having their front ends bent outward and secured to the under side of the share, as specified.

In testimony whereof I affix my signature in presence of two witnesses.

IRVEN C. LIGETT.

Witnesses:
W. O. MCKINSTRY,
E. E. HALL.